United States Patent
Lefevre et al.

(10) Patent No.: US 7,612,003 B2
(45) Date of Patent: Nov. 3, 2009

(54) RED GLASS, PROCESS FOR MANUFACTURING RED GLASS, AND TINTED BULBS AND TUBES OBTAINED WITH SUCH A GLASS

(75) Inventors: Christian Lefevre, Piney (FR); Francois Lepesqueux, Troyes (FR)

(73) Assignee: Vermont, Montieramey (FR)

( * ) Notice: Subject to any disclaimer, the term of this patent is extended or adjusted under 35 U.S.C. 154(b) by 536 days.

(21) Appl. No.: 11/489,723

(22) Filed: Jul. 20, 2006

(65) Prior Publication Data
US 2007/0021288 A1    Jan. 25, 2007

(30) Foreign Application Priority Data
Jul. 22, 2005    (FR) .................................. 05 07841

(51) Int. Cl.
*C03C 3/095* (2006.01)
*C03C 3/087* (2006.01)

(52) U.S. Cl. .............................. 501/64; 501/70; 501/71; 501/27; 501/32

(58) Field of Classification Search ............... 501/27, 501/32, 64, 70, 71; 313/636
See application file for complete search history.

(56) References Cited

U.S. PATENT DOCUMENTS 3,779,734 A    12/1973    Simonfi et al.

2002/0117950 A1    8/2002    Ulenaers et al.

FOREIGN PATENT DOCUMENTS

| DE | 10053450 A1 | 5/2002 |
| EP | 1193226 B1 | 4/2002 |
| EP | 1193226 B1 * | 7/2003 |
| FR | 1498643 A | 1/2008 |
| WO | 2004041739 A1 | 5/2004 |

OTHER PUBLICATIONS

U.S. Appl. No. 10/584,497, filed Jun. 22, 2006, entitled "Mixture For The Production Of An Amber Glass, Method For The Production Of Tubes And Blanks Of Tinted Bulbs, And Tinted Bulbs Obtained With Said Glass".

* cited by examiner

*Primary Examiner*—Karl E Group
*Assistant Examiner*—Elizabeth A Bolden
(74) *Attorney, Agent, or Firm*—Banner & Witcoff, Ltd.

(57) ABSTRACT

The invention relates to a bulk-tinted red glass formed from a glass batch based on a soda-lime-silica composition, to a process for manufacturing red glass and to a bulb obtained from a blank or a tube manufactured with such a glass. The batch comprises, per 100% by weight of the batch, 0.1 to 1% by weight of copper, 0.2 to 2% by weight of tin and 0.01 to 2.5% by weight of oxide of the lanthanide group and/or 0.01 to 0.5% by weight of silver in silver oxide or nitrate form.

15 Claims, 4 Drawing Sheets

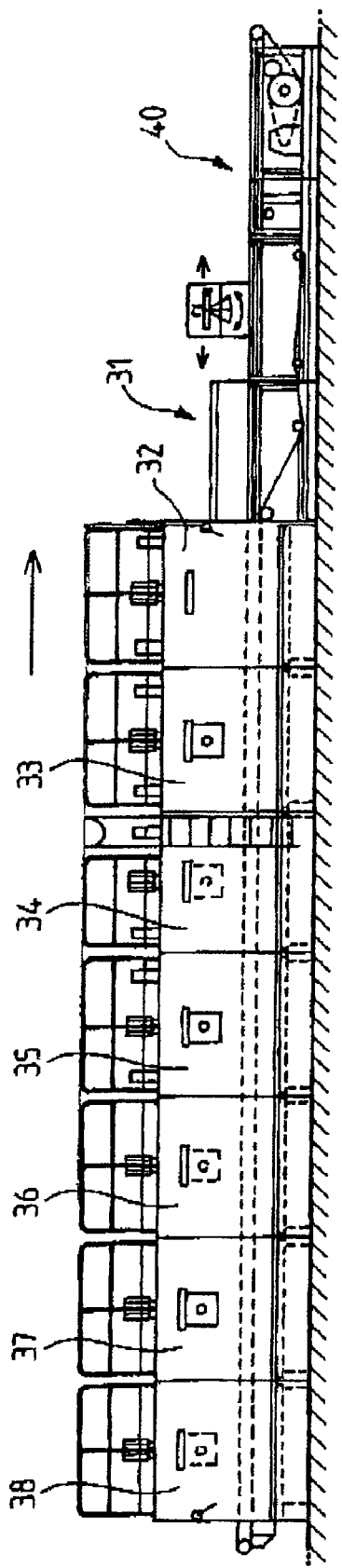
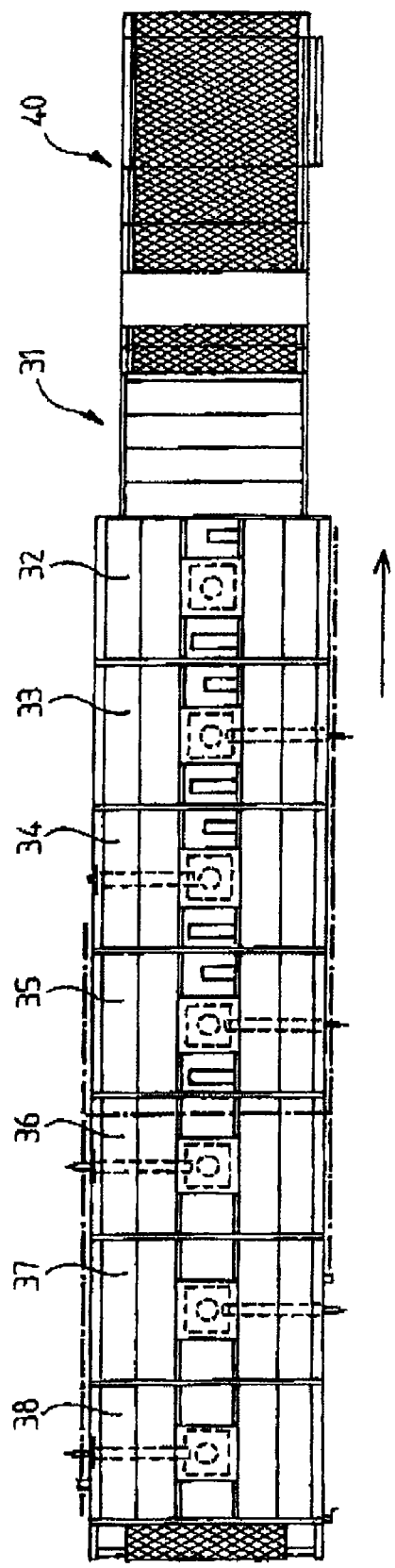
FIG.4
FIG.5

RED GLASS, PROCESS FOR MANUFACTURING RED GLASS, AND TINTED BULBS AND TUBES OBTAINED WITH SUCH A GLASS

The present invention relates to a bulk-tinted red glass formed from a glass batch based on a soda-lime-silica composition.

It also relates to a process for manufacturing red glass, and for manufacturing a tube and a bulb that are obtained with such a glass.

The invention is particularly applicable, but not exclusively, in the field of indicating bulbs (rear lights, brake lights) of motor vehicles.

The term "red colour" should be understood to mean the red tint that falls within the area as defined by international standards and in particular in the International Commission on Illumination reference work known as CIE 1931.

In Europe, the colorimetric space defined by the ECE regulation corresponds to a trapezoidal region whose X and Y coordinates are the following:

A (0.657-0.335)
B (0.665-0.335)
C (0.735-0.265)
D (0.730-0.263).

These points define the area reserved for indicating red, corresponding to the standardized calorimetric space shown in FIG. 2 accompanying the present description.

The International Commission on Illumination has itself defined a colour standard through the SAE J 578 standard, the boundaries of which are the following:

yellow boundary: Y=0.33
purple boundary: Y=0.98−X.

The boundaries define a quadrilateral, the graphical representation of which is also shown in FIG. 2.

More generally, the GTB (Groupe de Travail de Bruxelles [Brussels Working Group]) has, in order to fix the region reserved for signalling red in motor vehicles, adopted the broadened space comprising both the ECE and SAE regions.

The process conventionally used for obtaining these colours in soda-lime-based glasses involves the addition of cadmium and selenium.

The use of this process has however been curtailed since 1991 by a European Directive (91/338/ECE) with the aim of restricting the use of certain heavy metals, including cadmium.

It is possible to obtain red using another method, in which copper oxide is added to a soda-lime glass base.

This method has been used by the Applicant for many years for the manufacture of blanks intended for decorative illumination or for low-temperature applications (infrared radiation).

However, it is difficult to obtain and control of the process is complicated, particularly in the industrial manufacture of lighting lamps in which the thicknesses are small (0.5 to 1 mm).

The techniques of the prior art also have a major drawback. This is because they result in a low light transmission (8 to 15% of the emitted energy), not making it possible to supply products that can be used in particular for indicating in motor vehicles.

The object of the present invention is to alleviate these drawbacks in that it may allow the production of red glass whose chromatic coordinates lie within the standard defining indicating red, and to do so with an overall light flux transmission improved by about 20%.

To achieve this, the invention proposes a red glass, a process for manufacturing red glass, and tubes and bulbs thus tinted which better meet the practical requirements than those known hitherto, especially in that it proposes a glass containing no toxic materials subject to regulations and/or no environmentally hazardous materials, such as lead, cadmium, selenium or chromium, and in that the glass has a red colour that falls within the scope of the international indicating standards in force, it is stable over time, and it is insensitive to thermal shocks, while still allowing better transmission of the light flux.

For this purpose, the present invention proposes in particular a bulk-tinted red glass formed from a glass batch based on a soda-lime-silica composition, characterized in that said batch comprises, per 100% by weight of the batch, 0.1 to 1% by weight of copper, 0.2 to 2% by weight of tin and 0.01 to 2.5% by weight of oxides of the lanthanide group and/or 0.01 to 0.5% by weight of silver in silver oxide or nitrate form.

In advantageous embodiments, one or more of the following arrangements may additionally be employed:

the lanthanide is erbium or neodymium;

the copper is introduced in the form of red cuprous oxide or copper protoxide $Cu_2O$, part of the copper also being supplied by cupric chloride. It should be noted here that the metal provided by the copper oxide dissolves at high temperatures so as to form a supersaturated solution which, upon slow cooling, will precipitate at low temperatures with the formation of particles of copper metal, the dimensions of which will vary the tint. Here, the tint is said to be "colloidal" when the selective absorption of the metal in the finely divided (atomic) state transmits red light by absorbing blue light and green light;

the dimensions of the copper particles are range from about 10 nm and about 100 nm and more advantageously between 30 and 70 nm, where the term "about" should be understood to mean±1 to 2 nm. This is because between these two values is observed that the glass develops shades ranging from pink to deep ruby (by controlled cooling). Above 100 nm, the still ruby tint in transmitted light has a brown opalescence in reflected light due to agglomerations of excessively large particles (with very slow cooling). This form of crystallization may for example be demonstrated by SEM (Scanning Electron Microscopy);

the tin is introduced in the form of stannous oxide (SnO) or in the form of stannic oxide ($SnO_2$). Although not by itself a colorant, the tin will act as a nucleating agent and allow the proper development of the tint and contribute to its uniformity. Tin is also an element of variable valency, which helps to reduce ionic copper compounds (electron trapping) according to the formula: $Cu^{2+}+Sn^{2+}=Cu^0+Sn^{4+}$;

the batch includes reducing agents favouring the transformation of the oxide to metallic copper in an extremely finely divided state, selected from the following ingredients: pulverized coke, coal, carbon, sugar, bismuth, tartar and/or metal powders (regulus of antimony, zinc, aluminium); and the glass, after having been formed, is subjected to a heat treatment (annealing) in the following manner:

the formed glass (blank or tube form) is conveyed for a predetermined time, of between about 20 minutes and about 45 minutes, through a series of at least three independent heating boxes for example seven boxes numbered from 1 to 7 in the order of flow, between the temperature at which the glass leaves the furnace and the temperature at which the glass leaves the boxes, the temperature inside box 2 being between about 520° C. and 580° C., advantageously between about 540° C. and 565° C.

In practice, and in a manner known per se, parts are taken off every hour and a calorimetric check carried out so as to display any drift, which is immediately corrected by modifying the treatment parameters, such as the run speed of the conveyor and/or by modifying the temperatures in one or more zones of the cooling lehr or tunnel.

It should therefore be noted that the red glass thus produced contains no toxic or environmentally hazardous substances, that its colour is stable over time and is not sensitive either to thermal shocks or to changes in humidity, and at high temperatures, with proposed shades of colour that range from very light to very dark.

In addition, each shade is stable during manufacture and falls within the boundaries set by the customer's specification.

The invention also proposes a bulk-tinted red glass based on a soda-lime composition, comprising per 100% by weight of molten glass:

| | |
|---|---|
| $SiO_2$: | 69-75% |
| $Na_2O$: | between 2 and 8% |
| $K_2O$: | between 5 and 15% |
| $B_2O_3$: | between 0.5 and 4% |
| $LiO_2$: | between 0.1 and 3% |
| CaO: | between 5 and 9% |
| MgO: | between 0.2 and 1% |
| $Al_2O_3$: | between 0.2 and 2% |
| CuO: | between 0.2 and 1.5% |
| SnO: | between 0.2 and 2% |
| Cl: | between 0.02 and 0.3% |
| $Er_2O_3$: | between 0.01 and 2.5% |
| $Nd_2O_3$: | between 0 and 2.5% |
| $Ag_2O$: | between 0 and 0.5% | being understood that at least one proportion of the copper is introduced in the form of cupric chloride ($CuCl_2$), the role of which is to help in the refining and to improve the transmission.

It should be noted that elements such as $Fe_2O_3$, $TiO_2$, $ZrO_2$, etc. are not intentionally added, but are present as impurities.

The invention also proposes a bulk-tinted red glass, the physical properties of which are around the following (the word "around" should be understood to mean within the ±10° C. ranges):

| |
|---|
| melting point ($\log\eta = 2$): 1435° C.; |
| working point ($\log\eta = 4$): 995° C.; |
| softening point ($\log\eta = 7.6$): 690° C.; |
| annealing point ($\log\eta = 13$): 505° C.; |
| $T_g$ ($\log\eta = 13.3$): 495° C.; |
| strain point ($\log\eta = 14.5$): 475° C.; and |
| $\Delta l_{20/300° C.} = 93 \times 10^{-7}$. |

The invention also proposes a glass batch for obtaining the above red glass.

It also proposes blanks and/or tubes made of red glass of the type described above.

The red glass blanks thus provided may be used for producing incandescent lamps that are intended for indicating in vehicles, domestic and decorative lighting, low-temperature heating and drying, and for the medical and paramedical field (pain therapy).

The invention also proposes a process for obtaining the red glass as described above.

In one advantageous method of implementing the process according to the invention, the shade of the tint of the glass is controlled by modifying the oxidation-reduction parameters inside the heating furnace by adjusting the amount of metal-powder-based producing agent up to a level of 0.3% by weight of the batch.

The invention also proposes a bulb or tube made of red glass for a lighting system, for example for domestic and decorative lighting, obtained from a blank and from a process as described above, or else for use as indicating means in motor vehicles.

The blank, formed from a gob of glass immediately on leaving the furnace, and the red tint of which complies with the required colour standards, is thus obtained in a definitive manner with a specific treatment.

As was seen above, the red tint is obtained not only through the base chemical composition and the controlled and regulated melting conditions, but also the heat treatment conditions in the controlled cooling lehr or tunnel immediately after the forming operation.

The invention will be better understood on reading the following description of embodiments of the invention given by way of non-limiting examples.

The description will refer to the drawings that accompany it, in which:

FIGS. 4 and 5 are side and top views, respectively, of one embodiment of the cooling/annealing lehr of FIG. 3.

FIG. 1 shows a bulb 1, comprising a pod-shaped glass blank 2, based on glass of the $SiO_2/R_2O/R'O$ type where R is an alkali metal element and R' is an alkaline-earth metal element.

The blank is red in colour and obtained from a glass batch formed with sand from the Fontainebleau region of France and contains, for example, per 100% by weight of the batch, 0.5% by weight of copper, 1% by weight of tin, 2% by weight of lanthanide oxides and/or 0.2% silver nitrate.

The bulb 1 comprises, in a manner known per se, a cap 3 for connection to a power supply system, and a filament 4.

Thus, with the invention, the use of the glass batch described above, accompanied by control of the melting parameters (temperature and residence time in the furnace), known per se, optimized oxidation-reduction of the glass bath thanks to the tailored proportions, and the execution of a suitable cooling operation, as will be described more precisely below, makes it possible to manufacture blanks directly in the desired tint.

Figure 1:
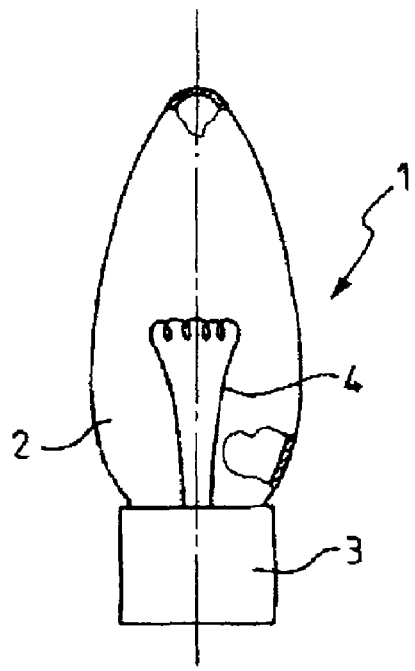
FIG. 1 is a side view of a bulb produced from a glass manufactured according to the invention.
Figure 1A:
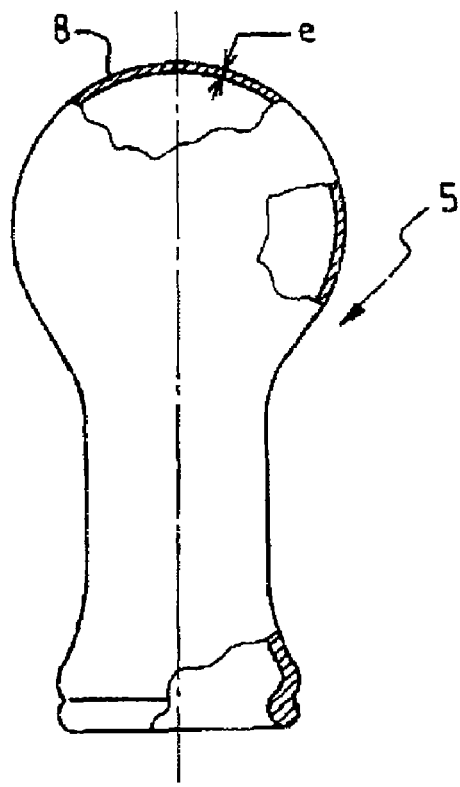
FIGS. 1A to 1C are side views of glass blanks for various shapes of bulbs according to the invention.
Figure 1B:
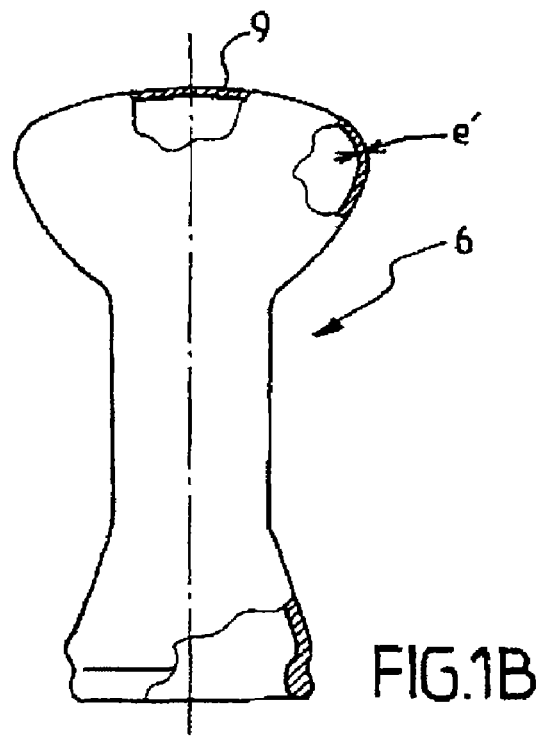
Figure 1C:
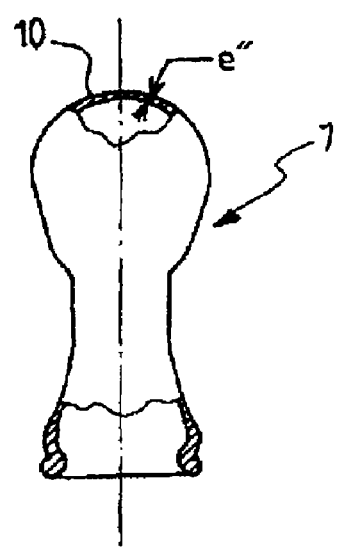

FIGS. 1A, 1B and 1C show other embodiments of glass blanks 5, 6 and 7 obtained by blowing a gob of bulk-tinted glass according to the invention, the blank 1C being designed for example for an automobile indicator.

The thickness e, e' and e" of the parison 8, 9 and 10 for the bulb blanks in their illuminating part is around 0.4 mm. This thickness depends on the weight of the glass and on its viscosity, with a dispersion that may range by up to about 0.2 mm, the above characteristics also being applicable to the bulb shown in FIG. 1.

In the prior art, it was difficult if not impossible to systematically provide a precise tint for the same parison thickness, which possibly resulted in tints outside the desired colour standard owing to the uncontrollable colour variation, which oscillated about the mean.

With the invention, since the dispersion is no longer due only to the difference in thickness, which can be roughly controlled mechanically, the tints are now always within the acceptable range.

Figure 2:
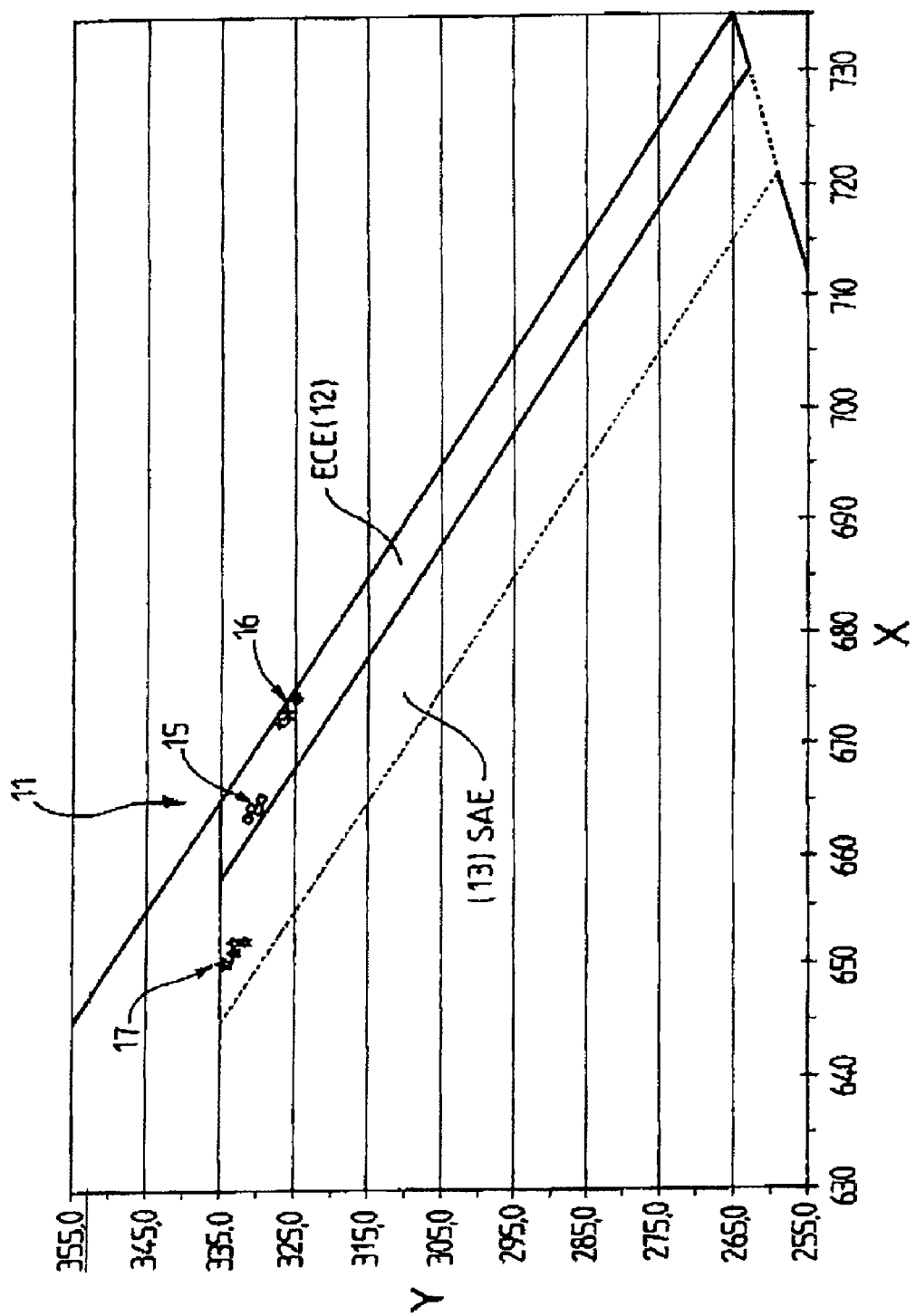
FIG. 2 is the diagram showing the standardized colorimetric space within which the colours of the red bulbs according to the invention reliably and constantly lie.

Plotted in FIG. 2 is the chromaticity diagram 11 showing the colour characteristics of glasses in the red colour rectangle of the glasses according to the invention according to the ECE (Economic Commission of Europe) standard (with the reference 12) and according to the SAE (Society of Automotive Engineers) standard (with the reference 13). The boundaries for the red colour in these standards may be represented by broadened quadrilaterals in the diagram, the ECE 12 standard being included within the broader quadrilateral of the SAE 13 standard, toward the higher purity region of the colour.

The stars 14, diamonds 15 and crosses 16 correspond to glass compositions having the following average electrical and photometric characteristics:

|  | $\phi$ ($\mu\lambda$) | P (W) | $\eta$ (lm/W) | Transparency |
|---|---|---|---|---|
| White glass | 443.9 | 25.6 | 17.4 |  |
| Red glass * (16) | 96.8 | 25.5 | 3.8 | 21.8% |
| Red glass ◇ (15) | 86.1 | 25.5 | 3.38 | 19.4% |
| Red glass + (16) | 79 | 25.4 | 3.11 | 17.8% |

It is to be noted that the transparency obtained with the invention is thus very much greater (>15%) than those of the red glasses of the prior art.

Comparisons with the standards are made visually, colorimetric measurements being taken using an integration sphere and a colorimeter manufactured by the Japanese company Minolta under the reference Chroma-meter CL100 connected to a computer of known type, for example a Minolta computer known by the reference DP100 in order to obtain overall colour values.

Measurements over more precise regions are then made using a colorimeter of the THOMA brand with the reference TF6-120.

In both cases, the illuminant is the standardized illuminant A, the proximal colour temperature of which is 2856 K. This illuminant is connected to a stabilized power supply, the voltage of which is adjusted to 13.5 V.

The measurements are taken at two points x and y in the CIE 1931 coordinate system. The measurements make it possible to define the saturation, the dominant wavelength and the position of the colour of the specimen in the chromaticity diagram, but above all the position relative to the two existing standards that define the red tint intended for signalling.

Plotted in this colour space are therefore the geometrical symbols (stars 15, crosses 17, etc.) representative of a few tint shades that the weight contents of copper, tin and lanthanides allow to be achieved.

Increasing this ratio demonstrates the capability of producing a multitude of different shades.

The blanks thus provided in shades of suitable tint may also be used for mounting domestic illumination and/or decorative lamps with a wide variety of shapes and tints achievable.

Thus, the glasses produced may advantageously replace the fancy bulbs intended for decoration and coated with a red varnish, such as for example those shown in FIGS. 1, 1A and 1B.

The processes for continuously manufacturing blanks will now be described with reference to FIGS. 3 and 4 according to the embodiment of the invention more particularly described here.

Figure 3:
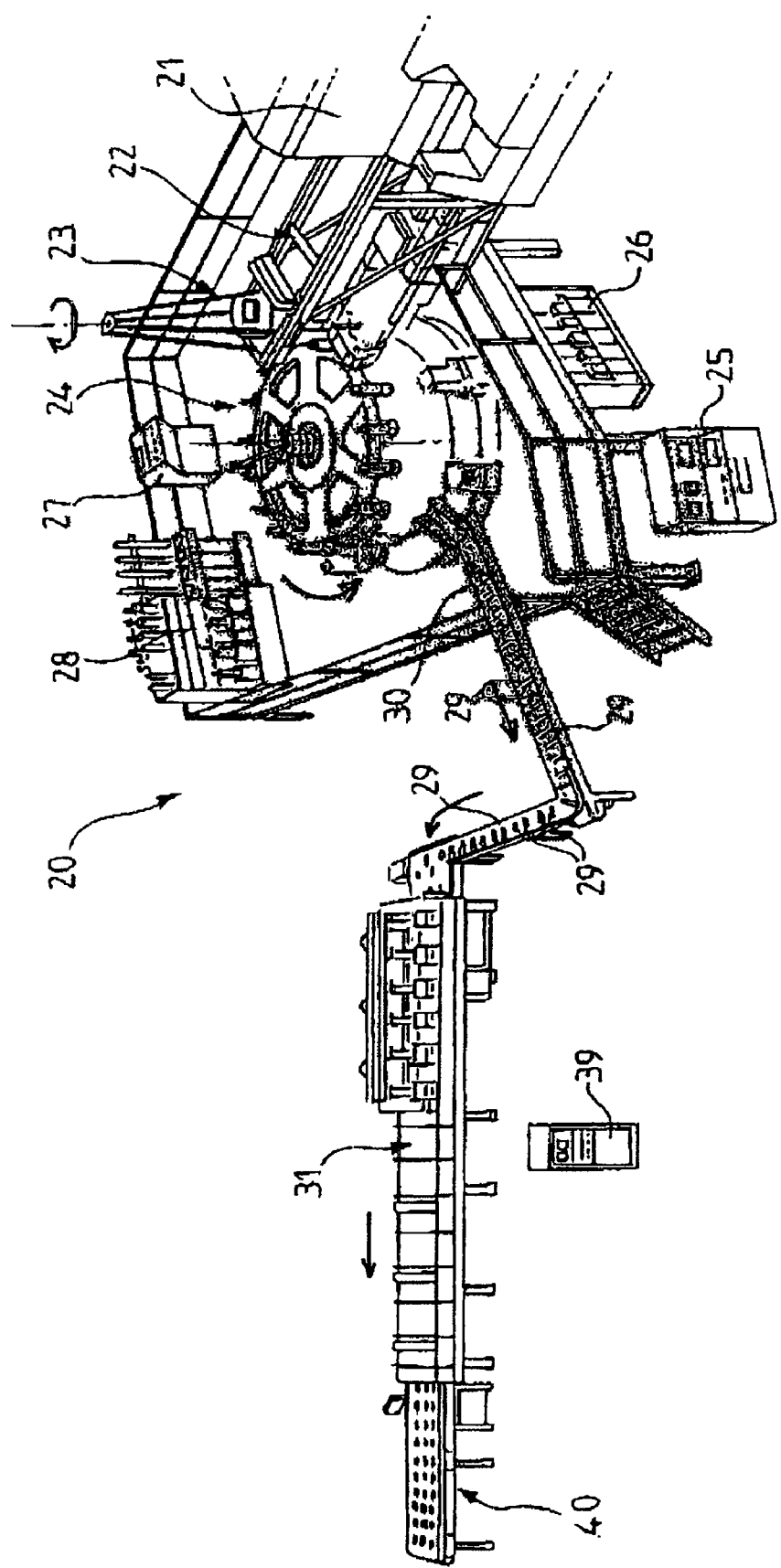
FIG. 3 is a schematic perspective view of an installation for implementing one way of carrying out the process according to the invention applied to bulbs.

FIG. 3 shows an installation 20 for implementing the process according to the invention more particularly described here.

It comprises the glass melting furnace 21, a channel 22 for filling with molten glass from the furnace, a distributor 23 feeding the carrousel 24 for forming the blanks, the operation of which will be more particularly described below, automatic regulation and control means 25 for the compressed-air supply 26, for the cooling air supply 27 and for the blown-air regulation/distribution 28.

The latter comprises in particular a compressor and means for stabilizing the pressure exerted during blowing by means of an automatic process control system.

The carrousel then feeds formed blanks 29 to a conveyor belt 30 that passes continuously through a cooling lehr 31, the purpose of which is to maintain the temperature of the blanks at about 550° C., for example for a time ranging from 1 to 2 minutes so as to relieve the glass of its internal tensile stresses created when suddenly cooled (from 1200° C. to 580° C.) on the machine during moulding and then to cool these blanks slowly (over about 20 to 30 minutes) down to room temperature, in order to obtain the red colour in the desired shade.

The annealing lehr is adapted for this type of tint.

The dimensions of the lehr and the arrangement of the multiple heating zones make it possible to control the stability of the colour or its shades in real time without correspondingly affecting the actual annealing process inherent in any hot glass manufacture.

The lehr, which is also shown in FIGS. 4 and 5, is made up of seven completely independent heating or cooling boxes 32, 33, 34, 35, 36, 37 and 38.

The temperatures and the control are specific to each of the boxes and allow multiple and reliable adjustments to be made.

All the boxes are equipped with centrifugal fans, the purpose of which is to stir the air in order to maintain a low gradient over the entire volume of the box.

The optimum temperature for correct development of the colour inside box 37 is between 540° C. and 565° C.

The temperature is then progressively lowered, depending on the article or the position of the colour in the colorimetric diagram, down to room temperature.

The total time taken to pass through the lehr 31 varies from about 20 minutes to about 45 minutes.

Automatic control means 39 allow proper operation of the conveyor belt, the blanks continuously obtained at a rate for example of 90 per minute, and with their definitive colour, after passing through the lehr 31 in order to cool down from 500° C./600° C. to 40° C.

They are then collected at the exit of the tunnel at 40 in order to be stored.

The various forming steps/stations for manufacture by blowing are now described below.

After preparation of the batch in the defined proportions, successive batches are introduced into the furnace in order to feed the glass melt bath. The glass paste is thus heated in a known manner to a temperature of 1350° C. to 1500° C., at which it is maintained for a specified melting time within the competence of a person skilled in the art.

The molten paste flows slowly toward the carrousel 24, to be removed at a temperature of around 1150° C. from a bowl, the formation of the blank then taking place according to the following steps:

41. Preparation of the glass (bowl temperature);
42. Formation of the gob (feeder plunger);
43. Cutting of the gob (shears);
44. Position of the gob on the marver;
45. Pressing of the gob into a disk shape;
46. Transfer and deposition on the tables;
47. Localized cooling of the disk;
48. Stretch cooling;
49. Water spraying into the furnished half-moulds;
50. Start of rotation of the tables;
51. Removal of excess water from the moulds;
52. Self-formation of the parison;
53. Lowering of the ring-forming nozzle;
54. 1st blowing into the parison;
55. Blowing onto outside of the parisons;
56. 2nd blowing into the parison;
57. Closure of the moulds;
58. 1st fill blowing;
59. 2nd finish blowing;
60. Rise of the nozzle;
61. Opening of the mould;
62. Reheat torch;
63. Table rotation stoppage;
64. Separation of the ring in the blank;
65. Ejection of the blank;
66. Ejection of the ring, spraying of the tables;
67. Air cooling of the tables;
68. Conveying of the objects to the cooling lehr; and
69. Entry into the cooling lehr.

In the embodiment more particularly described, this equilibrium is further enhanced by the presence of a reducing agent, such as aluminium powder, strong oxidation always resulting in a loss of colour.

It goes without saying, and as it also results from the foregoing, that the present invention is not limited to the embodiments more particularly described. On the contrary, it embraces all the variants thereof and especially those in which it is tubes and not blanks that are thus produced.

The invention claimed is:

1. Bulk-tinted red glass formed from a glass batch based on a soda-lime-silica composition, characterized in that said batch comprises, per 100% by weight of the batch, 0.1 to 1% by weight of copper, 0.2 to 2% by weight of tin and 0.01 to 2.5% by weight of oxides of the lanthanide group and/or 0.01 to 0.5% by weight of silver in silver oxide or nitrate form.

2. Red glass according to claim 1, characterized in that the lanthanide is erbium or neodymium.

3. Red glass according to claim 1, characterized in that the copper is introduced in the form of red cuprous oxide or copper protoxide $Cu_2O$, part of the cooper also being supplied by cupric chloride.

4. Red glass according to claim 1, characterized in that the dimensions of the copper particles range from about 10 nm to about 100 nm.

5. Red glass according to claim 4, characterized in that the copper particle dimensions range between about 30 nm and about 70 nm.

6. Red glass according to claim 1, characterized in that the tin is introduced in the form of stannous oxide (SnO) or in the form of stannic oxide ($SnO_2$).

7. Glass according to claim 1, characterized in that the batch includes reducing agents favouring the transformation of the oxide to metallic copper in an extremely finely divided state, selected from the following ingredients: pulverized coke, coal, carbon, sugar, bismuth, tartar and metal powders (regulus of antimony, zinc, aluminium).

8. Bulk-tinted red glass based on a soda-lime composition, comprising per 100% by weight of molten glass:

| | |
|---|---|
| $SiO_2$: | 69-75% |
| $Na_2O$: | between 2 and 8% |
| $K_2O$: | between 5 and 15% |
| $B_2O_3$: | between 0.5 and 4% |
| $LiO_2$: | between 0.1 and 3% |
| CaO: | between 5 and 9% |
| MgO: | between 0.2 and 1% |
| $Al_2O_3$: | between 0.2 and 2% |
| CuO: | between 0.2 and 1.5% |
| SnO: | between 0.2 and 2% |
| Cl: | between 0.02 and 0.3% |
| $Er_2O_3$: | between 0.01 and 2.5% |
| $Nd_2O_3$: | between 0 and 2.5% |
| $Ag_2O$: | between 0 and 0.5% | being understood that at least one proportion of the copper is introduced in the form of cupric chloride ($CuCl_2$), the role of which is to help in the refining and to improve the transmission.

9. Bulk-tinted red glass, according to claim 8 the physical properties of which are around the following:

| |
|---|
| melting point ($\log\eta = 2$): 1435° C.; |
| working point ($\log\eta = 4$): 995° C.; |
| softening point ($\log\eta = 7.6$): 690° C.; |
| annealing point ($\log\eta = 13$): 505° C.; |
| $T_g$ ($\log\eta = 13.3$): 495° C.; |
| Strain point ($\log\eta = 14.5$): 475° C.; and |
| $\Delta l_{20/300° C.} = 93 \times 10^{-7}$. |

10. Process for manufacturing a red glass from a batch based on a soda-lime-silica composition, characterized in that the following are added to the batch, per 100% by weight: 0.1 to 1% by weight of copper; 0.2 to 2% by weight of tin; and 0.01 to 2.5% by weight of lanthanide oxide and/or 0.1 to 0.5% by weight of silver in silver oxide or nitrate form.

11. Process for manufacturing a red glass according to claim 10, characterized in that the lanthanide is erbium and/or neodymium.

12. Process according to claim 10, characterized in that the glass after being formed is heat treated in the following manner:
   the formed glass (blank or tube form) is conveyed for a predetermined time, of between about 20 minutes and about 45 minutes, through a series of at least three independent heating boxes numbered in the order of flow, between the temperature at which the glass leaves the furnace and the temperature at which the glass leaves the boxes, the temperature inside box 2 being between about 520° C. and 580° C., advantageously between about 540° C. and 565 ° C.

13. Process for manufacturing a red glass according to claim 10, characterized in that the copper is introduced in the form of red cuprous oxide or copper protoxide $Cu_2O$, part of the copper also being supplied by cupric chloride.

14. Process for manufacturing a red glass according to claim 10, characterized in that the tin is introduced in the form of stannous oxide (SnO) or in the form of stannic oxide ($SnO_2$).

15. Bulb made of red glass for a lighting system, said bulb being obtained from a blank or a tube produced with the glass according to claim 1, for use as a brake light or indicating light for motor vehicles.

* * * * *